United States Patent [19]

Howard

[11] 3,934,287

[45] Jan. 27, 1976

[54] COMBINATION SKI MAINTENANCE TOOL

[76] Inventor: G. Wix Howard, P.O. Box 16194, Denver, Colo. 80216

[22] Filed: Jan. 6, 1975

[21] Appl. No.: 538,950

[52] U.S. Cl. .................. 7/14.1 R; 29/80; 30/172; 30/287; 30/294; 51/205 WG
[51] Int. Cl.² .................. B26B 27/00; B24B 15/00; B25F 1/00
[58] Field of Search ............ 30/286, 287, 288, 294, 30/142, 169, 172, 314, 317, 329; 51/205 WG; 29/76, 78, 80; 7/1 R, 14.1 R

[56] References Cited
UNITED STATES PATENTS

| | | | |
|---|---|---|---|
| 2,373,829 | 4/1945 | Hicks, Sr. | 51/205 WG |
| 2,882,594 | 4/1959 | Long | 30/294 X |
| 3,561,169 | 2/1971 | Pirzek et al. | 51/205 WG |
| 3,732,619 | 5/1973 | Grueber | 30/287 |

Primary Examiner—Al Lawrence Smith
Assistant Examiner—Roscoe V. Parker, Jr.
Attorney, Agent, or Firm—Sheridan, Ross & Fields

[57] ABSTRACT

A tool in its preferred form includes a body, a file carried by the body for filing the bottom and side edges of a ski, a scraping blade carried by the body to remove excess wax and filler and to press wax into the ski surface, and a cork block to serve as a handle and to polish a ski bottom surface. The body may be of any desired shape but is preferably right triangular in planform and shallow compared to its lateral and longitudinal dimensions. A first face has a seat for a file along its diagonal aft margin and a guide wall along its longitudinal side margin which guides the body for longitudinal movement along the ski with the file crossing the ski bottom diagonally. The forward end contains a seat to hold a scraper blade for scraping excess filler and wax from the bottom and for pressing wax into the ski surface. The cork block protrudes from the second face of the body to serve as a handle and also to polish the waxed ski surface. One or more protuberances extend from the body with a cross section corresponding to the cross section of a ski center groove and are used to remove excess plastic filler and wax therefrom.

25 Claims, 11 Drawing Figures

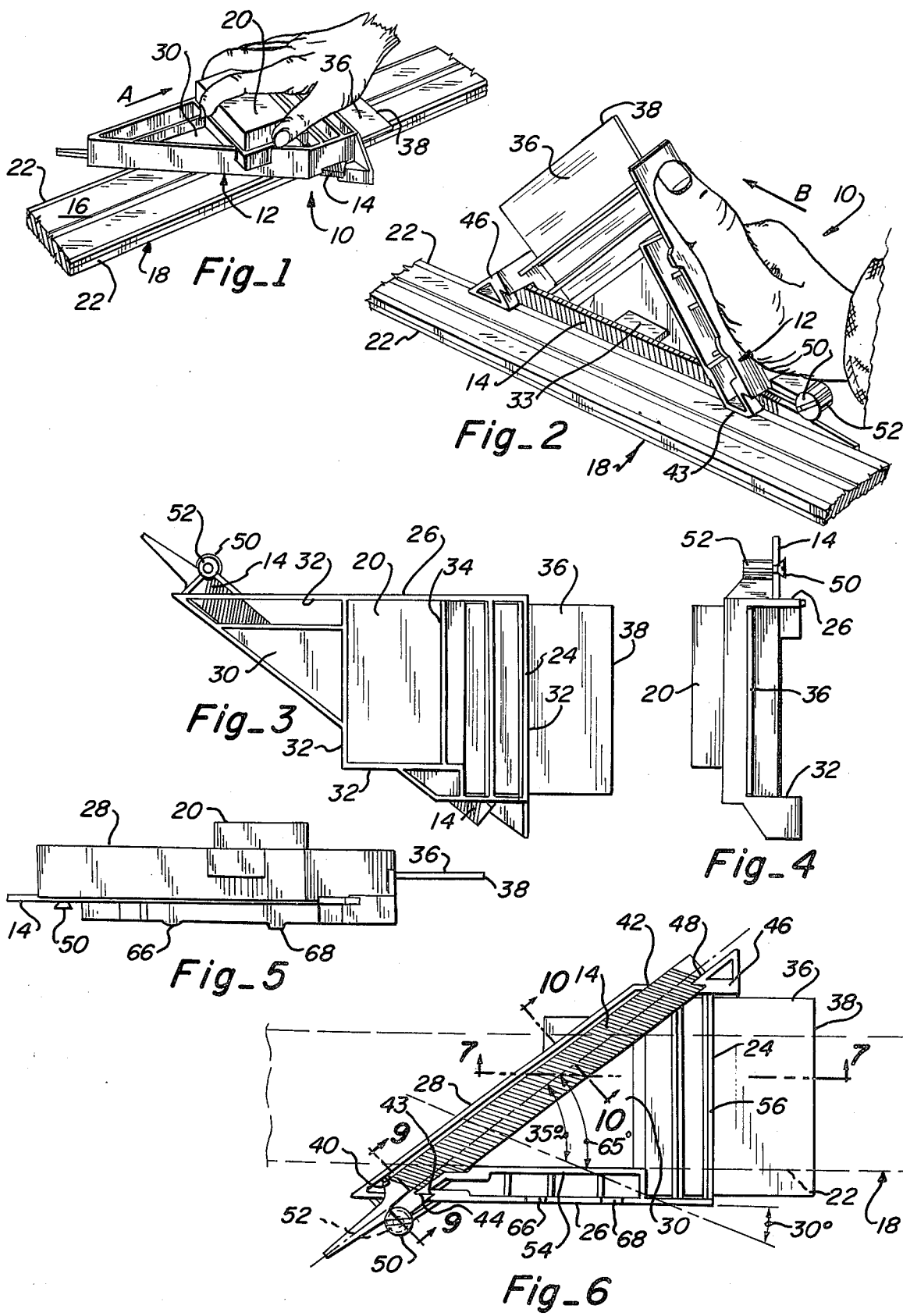

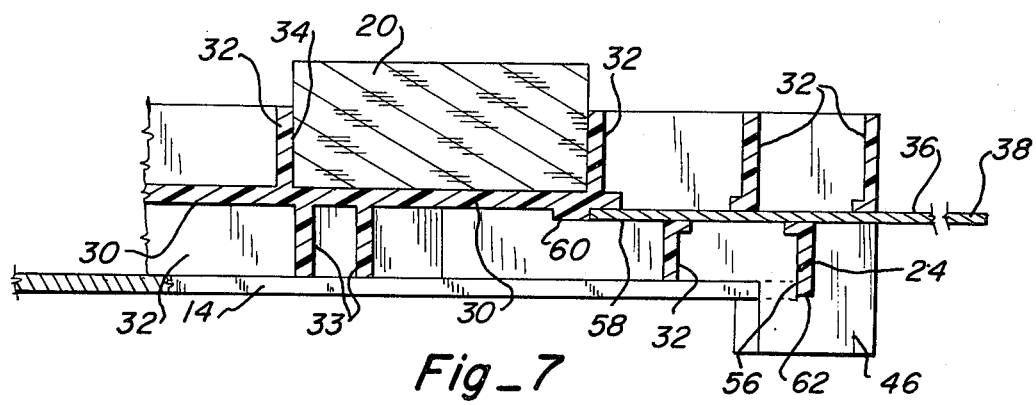
Fig_7
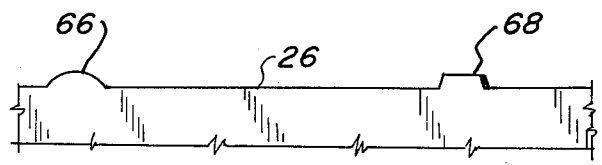
Fig_8
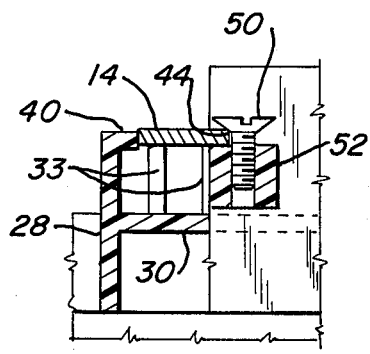
Fig_9
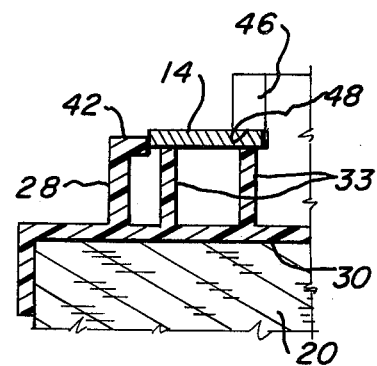
Fig_10
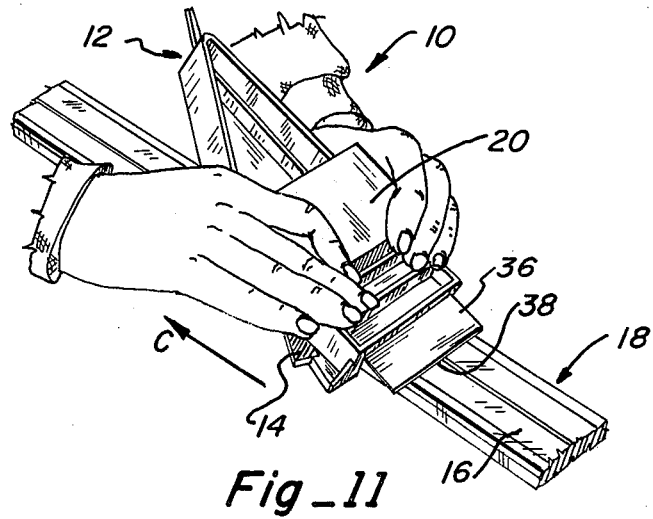
Fig_11

COMBINATION SKI MAINTENANCE TOOL

BACKGROUND OF THE INVENTION

This invention lies in the field of maintenance tools and is directed to a tool for maintaining snow skis. It is more particularly directed to a combination tool which performs all of the standard functions called for in maintaining skis in first class condition.

Skiing has become a very popular sport in the United States as well as in many other countries around the world, and there are now millions of skiers using the slopes every season. The quality of skis has been gradually increasing over the years, and more and more skiers are using the best skis they can buy. As the quality of skis has improved, the users have become increasingly aware of the desirability of maintaining them in first class condition at all times. The best skiers believe that their skis should be maintained after each day of use.

Standard maintenance includes repairing gouges and scratches in the bottom, flat filing the bottom, sharpening the edges, and waxing and corking the bottom. When this is done by a ski shop the cost is very high and consequently many skiers do their own maintenance as well as they can. For this purpose they use several separate tools, some of which require considerable skill in operation to improve the ski rather than damage it. Filing of the bottom and side edges is ordinarily done by gripping the ends of a medium size mill-type or mill bastard file and moving it along the length of the bottom and side edges. It is very difficult to control the attitude and direction of the file and it wanders laterally during longitudinal movement along the length of the ski. Since even the best file leaves microscopic scratches the result is random wavy scratches in the bottom which detract from the directional qualities of the ski. When the file is used on the side edges it is extremely difficult to keep the blade exactly perpendicular to the bottom. As the file wobbles in its movement along the length of the ski it produces an uneven edge which may have sharp, and wavy patterns rather than a uniform straight and sharp edge.

Modern ski bottoms are generally made of a high quality plastic material comprising almost the entire width, bordered on each side by an angle cross section steel strip to present a sharp right angled edge for control and maneuvering. One variety of plastic in common use goes under the trade name P-Tex. When gouges and scratches are found in the ski bottom a stick of P-Tex or similar plastic base repair and filler material is melted and dripped on the damaged spots, filling them in and leaving excess filler rising above the plane of the bottom. To attain a surface flat enough to apply a file, it is necessary to use a blade, such as a large putty knife with a straight laterally directed free edge and push or pull it along the ski bottom to remove the excess filler. This tool is also difficult to handle. If it is held at too flat an angle it tends to ride over the excess filler and if it is held at too steep an angle it tends to make new gouges which require further filling.

Thus, it will be seen that home repair by an unskilled operator may well do more harm than good, and that there is a definite need for a tool which requires very little skill in use and will perform the desired functions at a professional level.

SUMMARY OF THE INVENTION

The tool of the present invention overcomes the difficulties mentioned above and provides a simple and reliable unitary combination tool which guides the components mentioned above in proper attitudes to achieve professional results and performs all of the functions involved in standard maintenance operations.

Generally stated, the tool includes a supporting body, a file, a scraper blade, and a corking device. The body may be a solid block but preferably comprises a generally central planar web having ribs extending outward from both faces of the web and terminating in planes parallel to the web to achieve minimum weight of the tool while maintaining maximum rigidity.

A first face of the tool has a seat portion extending diagonally forward and across the width of the tool at an acute angle to a longitudinal side margin of the body. The file is mounted and secured in the seat portion with its tip adjacent to the forward end of the body and its tang adjacent to the aft end of the body to produce the desired cutting action when the body is moved forward. The body may have any suitable planform, such as a rectangle, but it is presently preferred to use a right triangular planform with a laterally extending forward margin, a longitudinally extending side margin, and a diagonally extending aft margin, with the file seated just inside the aft margin with a flat side exposed and parallel to the plane of the first face.

First and second guide means, preferably in the form of a guide wall and a pair of spaced mounting blocks, extend outward from the first face and perpendicular to the plane of the first face. The first guide means may be the side margin but presently is separate and spaced a short distance in from the side margin. A third guide means comprises a straight rib extending laterally across the tool body adjacent to the forward end and terminating substantially flush with the plane of the cutting face of the file. To use the tool for flat filing, it is positioned with the first face inverted and overlying the ski bottom. The file is brought into direct planar cutting contact with the bottom surface of the ski, and the first guide means is located in gliding contact with a side marginal edge. When the tool is pressed down and pushed forward, the file cuts the entire width of the flat ski bottom including the angle section metal protective corner strips. A mill-type file is used to produce a very smooth surface, and the angular mounting of the file is selected so that the teeth are at a substantial angle to the direction of motion to achieve the best possible results. The first and third guide means cooperate to inhibit both lateral and longitudinal rocking, and the tool may be operated in long perfectly straight sweeps exactly parallel to the ski axis so that any minute scratches caused by the file will also be parallel to the ski axis and will not hinder its performance.

The perpendicular orientation of the second guide means with respect to the first face serves a special purpose. The side marginal edges of the ski must be filed at an exact right angle to the ski bottom in order to provide smooth sharp edges for directional control. To accomplish this, the body is arranged at the side of the ski with the mounting blocks comprising the second guide means lying in flat facewise contact with the bottom surface of the ski, which locates the file face at the proper right angle to the bottom. The tool is manipulated in the same way in long sweeps and the edge is not only vertical but also sharp and straight.

The forward portion of the tool is provided with a seat in which is mounted a scraper blade having a straight laterally extending free edge. The blade is located parallel to the center web of the body and preferably in about the same plane. If desired, the blade edge may have a bevel on the lower face at such angle that the bevel lies flat on the surface in working position. As previously mentioned, the gouges in the surface of the ski bottom are repaired by dripping melted plastic filler on them, leaving some of the filler extending above the surface. This must then be scraped off to regain a flat surface. When the tool is in operating position, pressed down and pushed forward, the scraping edge will remove all of the excess filler without scratching the surface. Since the blade is wider than the ski, portions of the blade will contact the metal edges. In order not to scratch the edges the blade is made slightly softer. In general, the ski edges are steel of about 47 on the Rockwell C-scale while the blade is specially treated stainless steel of about 42 on the Rockwell C-scale.

When the ski has been waxed, the same tool in the same working position is drawn rearwardly and will scrape excess wax from the ski while forcing some of the wax into the relatively porous plastic base material.

The second face of the tool has a recess in which is mounted a large block of cork-like material which protrudes a substantial distance out from the plane of the face to serve as a handle for operating the tool. The tool may be inverted to press the cork against the ski surface and rub it back and forth to polish the waxed ski.

At least one protuberance extends outward from the body and has an end form with a cross section corresponding to the cross section of a ski center groove. After the waxing is finished, this protuberance is pushed through the groove from end to end to remove excess wax from the groove. The protuberance can also be used in a similar manner to remove plastic filler repair material from the center groove.

BRIEF DESCRIPTION OF THE DRAWINGS

Various other advantages and features of novelty will become apparent as the description proceeds in conjunction with the accompanying drawings, in which:

FIG. 1 is a perspective view of the tool of the invention mounted in flat filing position on the bottom of a ski;

FIG. 2 is a perspective view of the tool arranged in vertical position for edge filing;

FIG. 3 is a top plan view of the tool with file and scraper blade in place;

FIG. 4 is an end elevational view of the tool;

FIG. 5 is a side elevational view of the tool;

FIG. 6 is a bottom plan view of the tool showing the mounting of the file and the scraper blade;

FIG. 7 is an inverted sectional view taken on line 7—7 of FIG. 6;

FIG. 8 is a fragmentary side elevational view of a portion of the body with groove cleaning protuberances;

FIG. 9 is a sectional view taken on line 9—9 of FIG. 6;

FIG. 10 is a sectional view taken on line 10—10 of FIG. 6; and

FIG. 11 is a perspective view showing the tool angled to present the scraper blade in working position.

DESCRIPTION OF PREFERRED EMBODIMENTS

The tool 10 of the invention is generally illustrated in one working position in FIG. 1, in which the body 12 carries a file 14 on its lower first face to contact the bottom surfaces 16 of the ski 18 and a corking block 20 on its upper surface which serves as a handle for manipulating the tool. In FIG. 2 the tool is rotated 90 degrees and the file contacts the side marginal edge 22 of the ski to sharpen the edge.

The tool body is shown in more detail in FIGS. 3 to 5 where it may be seen that it is laterally and longitudinally extensive and relatively shallow. Although it may have any suitable planform such as a rectangle, it is presently preferred to use a right triangular planform with a laterally extending forward margin 24, a longitudinally extending side margin 26, and a diagonally extending aft margin 28. For lightness and rigidity the body is preferably made of a generally central planar web 30 with upstanding ribs 32 extending otuward from both faces of the web and terminating in common planes parallel to the web. Several of the ribs on the second side of the body form a recess 34 to retain the corking block 20 while other ribs form side walls around the periphery of the body. A scraper blade 36 is seated in the forward portion 24 of the body and extends outward in a plane parallel to the faces with a straight laterally extending scraping edge 38.

In the bottom plan view, FIG. 6, it will be seen that file 14 is mounted in seat portions of the first face of the body and extends diagonally just within aft margin 28. As can be seen in FIGS. 9 and 10 certain of the ribs, numbered 33, are of lesser height to form a slightly depressed seat for the file so that it extends only about half its thickness beyond the plane of the other ribs. An abutment 40 extends inward slightly from aft margin 28 near the tang end of the file and a second abutment 42 extends inward slightly near the tip end of the file to locate the aft side of the file. The mounting block 43 is undercut at 44 to receive the forward side of the file at the tang end, and a mounting block 46 extending outward from the other side of the body is undercut at 48 to form a square cornered recess which engages the side and the tip end of the file to locate it laterally and longitudinally. When the file is moved into the seating members an adjustable fastener 50, mounted in projection 52, is screwed down into engagement with the file at its tang end and locks it in place with a flat side exposed and parallel to the second face of the body.

The presently preferred guide means for the flat filing operations comprise a guide wall 54 arranged parallel to the side margin 26 of the body and extending perpendicularly outward from the first face of the body and defining a guide line for directional control of the longitudinal movement of the body. As indicated in FIGS. 1 and 6, the guide wall is held in gliding contact with the side marginal edge 22 of ski 18 and the tool is pushed down and moved forward in the direction of arrow A in FIG. 1 to flat file the ski bottom. As will be seen in FIG. 7, the third guide means comprising the foremost lower rib 56, and extending laterally across the body is longer than ribs 32 and its terminal edge 62 is substantially flush with the cutting face of the file so that it will contact the ski bottom and inhibit rocking of the tool. In FIG. 2 the second guide means comprising mounting blocks 43 and 46 which also extend perpendicular to the web 30 are placed flat against the ski bottom to position to file against the side marginal edge 22 of the ski, and the tool is moved forward in the direction of arrow B to file the side edge exactly perpendicular to the bottom to produce a sharp straight edge.

The standard mill bastard or mill-type file has at least one flat side provided with a multiplicity of closely spaced straight teeth extending diagonally across the width of the file at an angle of about 65 degrees to the axis of the file with the cutting edges directed toward the forward tip end of the file, as illustrated in FIG. 6, it being understood that the stated files are only illustratory. While variations in the arrangement are permissible it has been found that optimum results are obtained with the angular orientation illustrated in FIG. 6. The included angle between the axis of the file and the axis of the guide line defined by guide means 54 may be between 30 and 50 degrees with the optimum angle being about 35 degrees, giving an included angle between the axes of the file teeth and the axis of the guide line of about 30 degrees. At this angle the file teeth produce an extremely fine cut with no chatter.

The sectional view in FIG. 7 shows the manner of mounting scraper blade 36. As viewed in this figure, the space between the bottoms of the upper ribs and the tops of the lower ribs is substantially the same as the thickness of blade 36 so that the blade is push fit between them, and it is also a snug fit between the side walls of the body. The blade is pushed into the seat thus formed until its aft end 58 overlies rib 32 and is in contact with stop member 60. It is then ready to be used for scraping excess filler from the ski bottom.

As seen in FIG. 11, the tool is held with the cork side up and at such an angle that edge 38 of blade 36 contacts the bottom surface 16 of ski 18. It is then pressed down and pulled rearward in the direction of arrow C. A few long overlapping strokes will suffice to remove the excess filler and present a smooth flat bottom surface. It is presently preferred to form both ends of blade 36 with squared off edges 38 perpendicular to the plane of the blade. Since the blade may be reversed and also inverted there are four smooth sharp edges to insure a long working life. Of course, the edges may be readily re-sharpened, preferably by grinding for accuracy, so that the blade never has to be replaced.

After the other maintenance steps are completed, a suitable wax is applied to the bottom in customary fashion. It is desirable to remove excess wax and also to work some of the wax into the relatively porous plastic surface of the bottom and this is ordinarily a rather tedious task. The job is done in a simpler and more effective manner by use of the tool, which is held in the same way as shown in FIG. 11. The tool is pressed down and drawn rearward in the direction of arrow C in the same manner as in filler removal and the edge 38 acts as a wedge with high unit pressure to force some of the wax into the surface.

After the waxing is completed there is usually some excess wax and filler still lying in the center groove of the ski which detracts from its performance. To take care of this problem, one or more protuberances 66, 68 extend outward from the body and are shown as extending from margin 26. Protuberance 66 has a cross section corresponding to the arcuate cross section of some ski grooves while protuberance 68 has a cross section with angular side corresponding to the cross section of other ski grooves. The appropriate protuberance is set down into the groove and pushed axially the full length of the groove, thus removing all excess wax or filler material.

The corking tool is preferably a large block of cork-like material seated in recess 34 and serving as a handle for most of the operations. When the tool is inverted and arranged parallel with the bottom, the flat surface of the cork is placed in contact with the bottom and rubbed back and forth to produce a high polish. In lieu of cork-like material 20, a suitable synthetic material may be used.

It will be seen that the invention described above and illustrated in the drawings provides a simple but effective unitary combination tool which performs all of the standard maintenance operations necessary to keep skis in first class condition.

What is claimed is:

1. A combination ski-maintenance tool comprising:
  a laterally and longitudinally extensive shallow body having a first face and a second face;
  at least a portion of the first face lying in a common plane;
  guide means extending outward from the common plane to define a guide line for directional control of longitudinal movement of the body;
  the guide means being arranged to contact and glide along a side marginal edge of a ski when the first face of the body is located in parallel overlying relation to the bottom surface of the ski to guide the body in longitudinal travel along the axis of the ski;
  a file carried by the body;
  the first face of the body being formed to receive and retain the file with a flat side exposed and parallel to the plane of the first face and with the axis of the file extending across the face at a substantial angle to the guide line defined by the guide means for direct planar cutting contact of the exposed side of the file with the full width of the bottom surface of the ski and with the guide means in guiding contact with the side marginal edge of the ski.

2. A tool as claimed in claim 1; in which
  the guide means extend perpendicular to the plane of the first face to lie in gliding contact with the bottom surface of the ski and guide the file along the side edge of the ski in an attitude perpendicular to the bottom surface of the ski to create a sharp edge.

3. A tool as claimed in claim 1; in which
  the included angle between the axis of the file and the axis of the guide line is between 30° and 50°.

4. A tool as claimed in claim 1; in which
  the included angle between the axis of the file and the axis of the guide line is of the order of 35°.

5. A tool as claimed in claim 1; in which
  the file is a mill-type file having teeth extending diagonally across the width of the file, and the included angle between the axis of the file and the axis of the guide line is selected to cause the file teeth to be directed at an acute angle to the axis of the guide line.

6. A tool as claimed in claim 5; in which
  the file teeth are directed at an angle of about 65° to the file axis, the file axis is at an angle of about 35° to the axis of the guide line and the direction of the file teeth is at an angle of about 30° to the guide line.

7. A tool as claimed in claim 1; in which the first face of the body is provided with seat means on which the file blade rests, abutment means to engage each side of the blade to prevent lateral displacement, stop means to engage the tip end of the blade and locate it longitudinally, and fastener means to engage the tang end of the blade and lock the file in place.

8. A tool as claimed in claim 1; in which
the body is generally right triangular in planform with a laterally extending forward margin, a longitudinally extending side margin, and a diagonally extending aft margin;
the file blade extends along the aft margin; and
the guide means extends parallel to the side margin.

9. A tool as claimed in claim 1; in which
a protuberance extends outward from the second face of the body to serve as a handle for operating the tool.

10. A tool as claimed in claim 9; in which
the protuberance comprises a block of cork-like material to serve as a polishing tool for the waxed bottom surface of a ski.

11. A tool as claimed in claim 1; in which
the forward portion of the body is provided with a mounting seat; and
a scraper blade is mounted in the seat extending forward from the body;
the forward end of the blade being formed with a straight laterally extending scraping edge to scrape excess filler from the bottom surface of a ski when propelled forward by movement of the body.

12. A tool as claimed in claim 11; in which
the body is provided with a straight laterally extending lower edge adjacent to the forward end of the body to serve as a fulcrum to position the blade at a predetermined angle to the ski surface.

13. A tool as claimed in claim 12; in which
the scraping edge of the blade is formed with a bevel at the lower face;
the bevel being formed at such an angle that it lies parallel to the ski surface when positioned by the fulcrum edge of the body to shave excess filler in forward motion and to press wax into the ski surface in aft motion.

14. A tool as claimed in claim 1; in which
at least one protuberance extends outward from the body and is formed with a cross section corresponding to the cross section of the center groove of a ski to be moved along the length of the groove and remove excess wax therefrom.

15. A combination ski-maintenance tool comprising:
a laterally and longitudinally extensive shallow body having a first face and a second face;
at least a portion of the first face lying in a common plane;
an elongate guide wall extending outward from the common plane and perpendicular thereto to contact and glide along a side marginal edge of a ski and guide the tool in longitudinal motion along the axis of the ski with the first face parallel to and in proximity to the bottom surface of the ski;
a mill-type file carried by the body;
the first face of the body being formed to receive and retain the file with a flat side exposed and parallel to the face of the body and with the axis of the file extending diagonally across the face at an acute angle to the guide wall to enable the file face to engage in direct cutting contact with the full width of the bottom surface of the ski and inhibit lateral and longitudinal rocking of the tool during the filing operation.

16. A tool as claimed in claim 15; in which
the body is generally right triangular in planform with a laterally extending forward margin, a longitudinally extending side margin, and a diagonally extending aft margin;
the file blade extends forwardly adjacent to the aft margin with its tang at the aft apex of the triangle; and
the guide wall extends parallel to the side margin.

17. A tool as claimed in claim 16; in which
the angle of the file axis and the aft margin is about 35° with respect to the axis of the guide wall.

18. A tool as claimed in claim 17; in which
the forward portion of the body is provided with a mounting seat; and
a scraper blade is mounted in the seat extending forward from the body;
the forward end of the blade being formed with a straight laterally extending scraping edge to scrape excess filler from the bottom surface of a ski when propelled forward by movement of the body.

19. A tool as claimed in claim 18; in which
a protuberance extends outward from the second face of the body to serve as a handle for operating the tool.

20. A tool as claimed in claim 19, in which
the protuberance comprises a block of cork-like material to serve as a polishing tool for the waxed bottom surface of a ski.

21. A tool as claimed in claim 15; in which
the body comprises a generally central planar web provided with a plurality of ribs extending outward from both faces of the web and terminating in planes parallel to the web to achieve minimum weight of the tool while maintaining maximum rigidity.

22. A combination ski-maintenance tool comprising:
a laterally and longitudinally extensive shallow body having a longitudinal axis and provided with a working face;
at least a portion of the face lying in a common plane;
a file carried by the body;
the working face of the body being formed to receive and retain the file with a flat side exposed and parallel to the plane of the working face and with the axis of the file extending across the face at a substantial angle to the longitudinal axis of the body for direct planar cutting contact of the exposed side of the file with the full width of the bottom surface of the ski;
and guide means carried by the body and provided with guide surfaces to contact the bottom surface and a side marginal edge of the ski to guide the body with its longitudinal axis moving parallel to the axis of the ski and to inhibit lateral rocking of the body and tilting of the file out of flat facewise contact with the bottom surface of the ski.

23. A tool as claimed in claim 22; in which
a first portion of the guide means extends outwardly from the working face of the body and defines a guide line parallel to the longitudinal axis of the body.

24. A tool as claimed in claim 23; in which
a second portion of the guide means extends laterally across the forward end of the body and terminates in the plane of the exposed flat side of the file.
25. A tool as claimed in claim 24; in which the first portion of the guide means comprises an elongate wall extending along a longitudinal margin of the body and the second portion of the guide means comprises a rib extending out from the interior portion of the body and having a narrow marginal edge for contact with the bottom surface of the ski.

* * * * *